Aug. 24, 1954     K. E. EVRELL     2,687,117
TWO-HAND SAFETY CONTROL MECHANISM FOR MACHINE TOOLS
Filed May 23, 1951     5 Sheets-Sheet 1
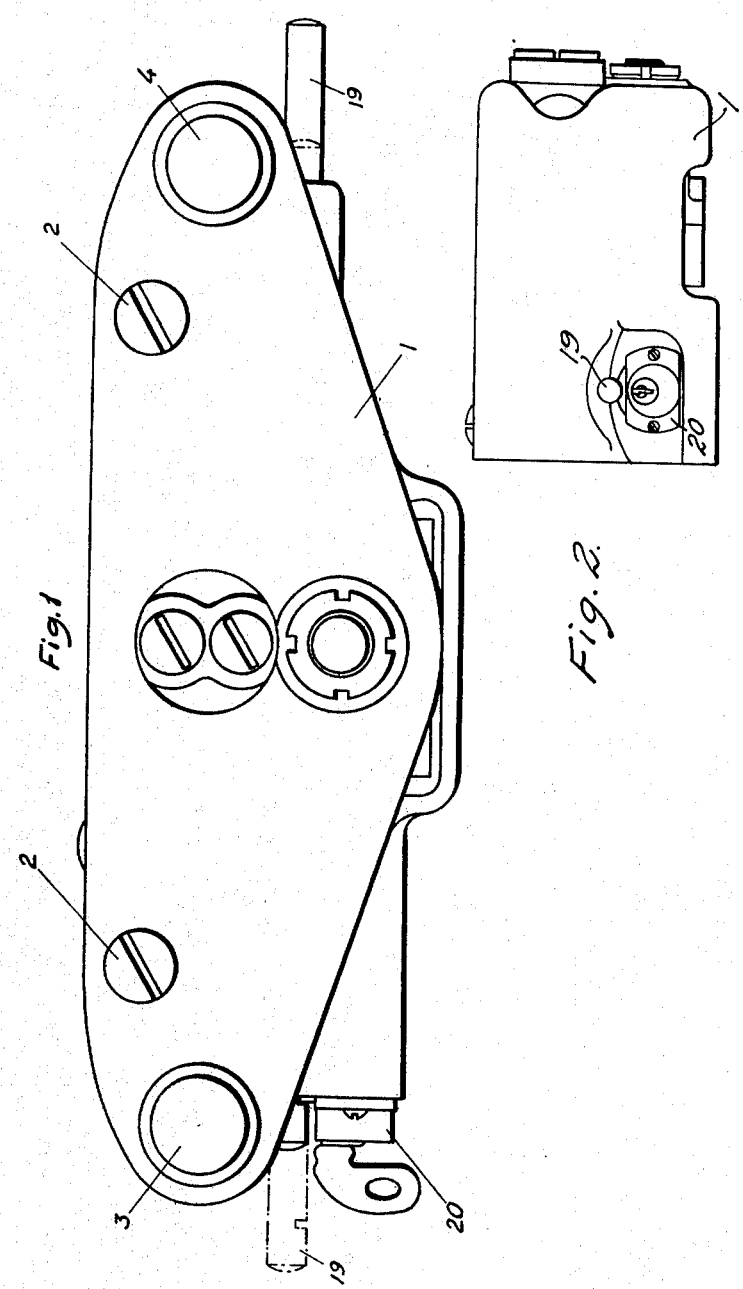
INVENTOR
KALEB EMIL EVRELL
BY: Darby & Darby
ATTORNEYS

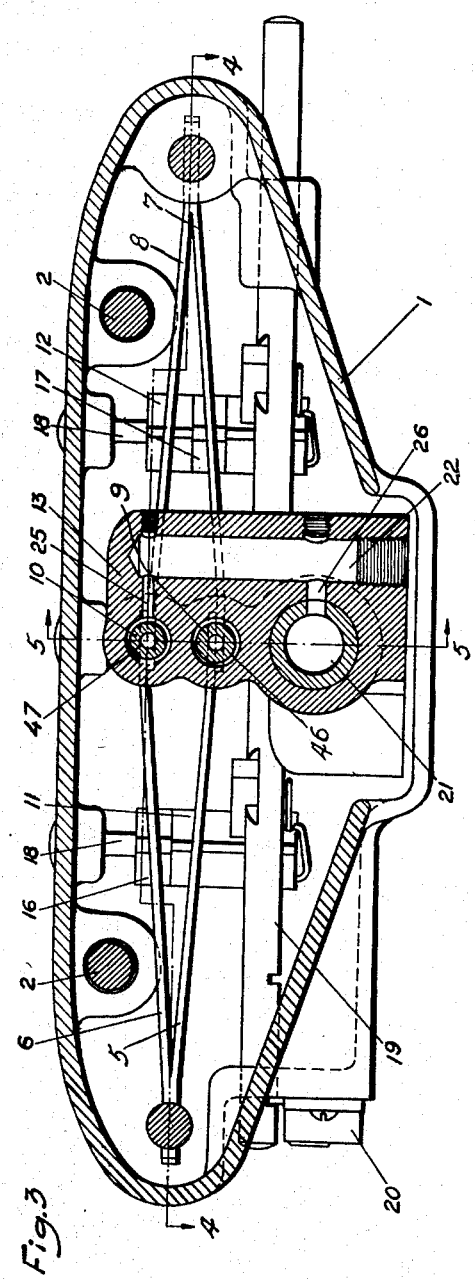

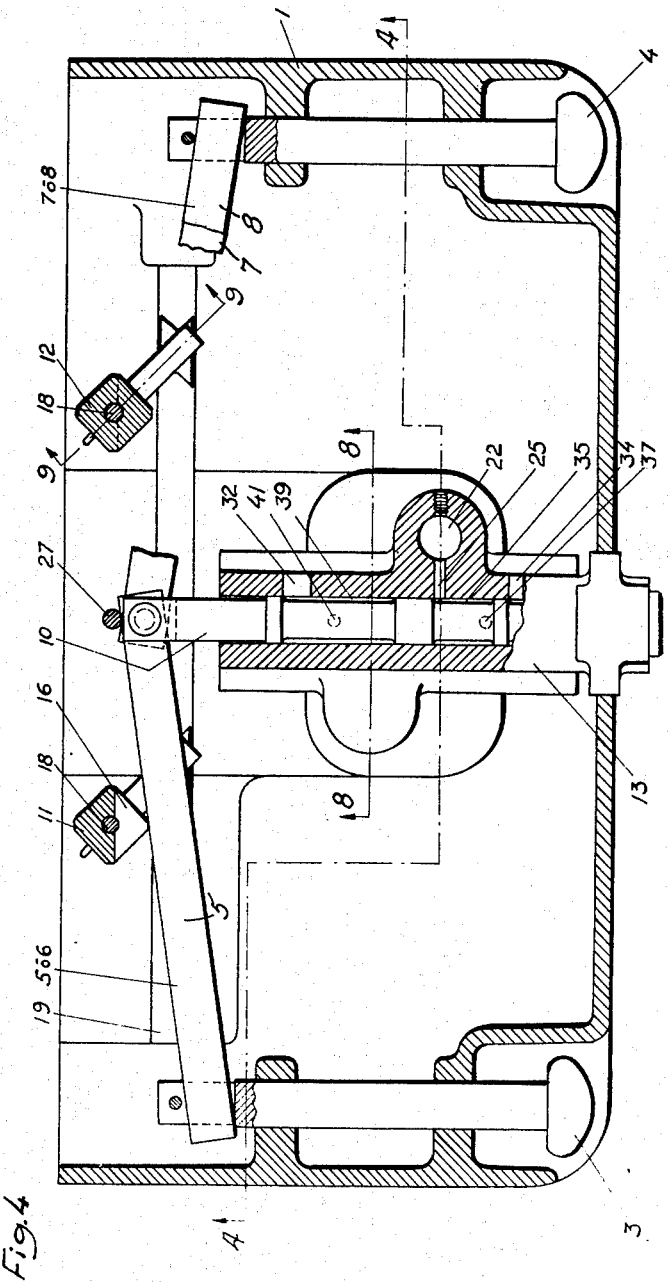

Aug. 24, 1954     K. E. EVRELL     2,687,117
TWO-HAND SAFETY CONTROL MECHANISM FOR MACHINE TOOLS
Filed May 23, 1951     5 Sheets-Sheet 4

INVENTOR
KALEB EMIL EVRELL
BY:
Darby & Darby
ATTORNEYS

Aug. 24, 1954          K. E. EVRELL          2,687,117

TWO-HAND SAFETY CONTROL MECHANISM FOR MACHINE TOOLS

Filed May 23, 1951          5 Sheets-Sheet 5

INVENTOR
KALEB EMIL EVRELL
BY: Darby & Darby
ATTORNEYS

Patented Aug. 24, 1954

2,687,117

UNITED STATES PATENT OFFICE 2,687,117

TWO-HAND SAFETY CONTROL MECHANISM FOR MACHINE TOOLS

Kaleb E. Evrell, Eskilstuna, Sweden, assignor to Aktiebolaget Bolinder-Munktell, Eskilstuna, Sweden Application May 23, 1951, Serial No. 227,855

Claims priority, application Sweden May 25, 1950

2 Claims. (Cl. 121—38)

The present invention relates to control mechanism for use with machine tools and particularly to a valve system embodying two manually operated valves, the operating means therefor being spaced apart so that the two valves can be operated simultaneously only by the use of two hands. By means of this arrangement it is necessary for the operator of a machine tool such as a punch press to remove his hands and arms from a danger zone between the moving and stationary portions of the press before the press can be started, thus assuring the safety of the operator of such a machine tool. At the present time there are provided various safety controls which are mechanical in nature and such devices, while effective to increase the operator's safety, require considerable manual effort and are for this reason not desirable.

The present invention embodies two easily operated valves which in turn control the flow of pressure fluid which acts as a servo power to control the actual starting of the machine tool. Furthermore, the two valves of the present invention are so arranged that it is necessary at each start to operate both control buttons, and further so that it is impossible to again start the machine until both buttons have been released and again depressed. With this arrangement it is impossible for the operator to in any way lock one of the valves in its operated position since an attempt to lock one valve in operated position and to operate with the other valve alone results in cycling the machine tool once after which it stops and cannot be started.

The present invention additionally contemplates an arrangement whereby the two-hand control may be converted by single hand control for the reason that there are some instances wherein a machine tool such as a punch press is operating upon work of such a size that the work may be adjusted without danger of the operator positioning his hands or arms in a dangerous location and that for such work a two-hand control is unnecessary. The means for converting to a one-hand control provided in the present invention is so arranged that it is operable only by one provided with a key so that the operator himself cannot determine whether a particular operation is dangerous or not and such determination is left to the supervisors who alone are provided with keys.

It is an object of the present invention to provide a safety control device for machine tools embodying a valve system which can be operated only by the use of two hands.

It is another object of the invention to provide such a system wherein the power for starting the machine tool is supplied by an external source such as a source of compressed air rather than by the manual effort of the operator.

It is another object of the invention to provide such a two-hand operated safety control which is so designed that it is impossible under any circumstances to operate it with one hand only.

It is a further object of the invention to provide such a control device which may be converted to a one-hand control at the discretion of the supervisory employees but not at the discretion of the operator.

It is a still further object of the invention to provide a two-hand safety control which will prevent the starting of the controlled machine tool if the supply from the power source is insufficient to produce a rapid and safe start. Otherwise the pressure from the compressed air source might be insufficient to assure rapid operation of the press starting mechanism and this would permit the operator to depress the two control buttons, and thereafter before the press started place his hands or arms or both between the press head and the die-bed.

It is a still further object of the invention to provide such a safety control device which is a unitary structure readily adapted to mounting on the particular machine tool which it is to control.

Other objects and features of the invention will be apparent when the following description is considered in connection with the annexed drawings, in which:

Figure 1 is a front view of a pneumatic, safety two-hand control starting device according to the invention, adapted to be secured to the front of a press or other machine tool.

Figure 2 is a lateral elevation of the device of Figure 1.

Figure 3 is a vertical section of the device according to Figure 1, the view being taken on the plane of the line 3—3 of Figure 2.

Figure 4 is a horizontal section taken on line 4—4 of Figure 3.

Figure 5:
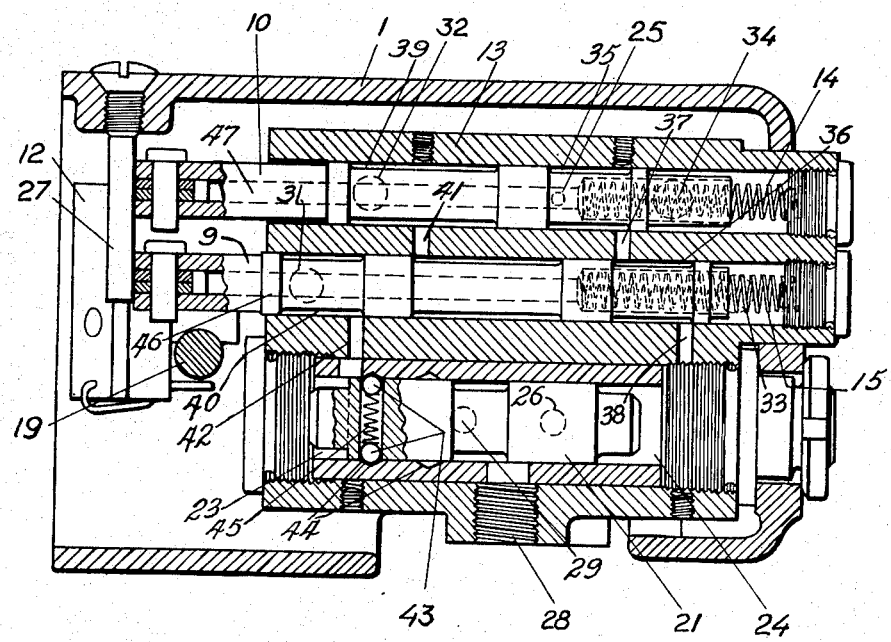
Figure 5 is a cross section taken on line 5—5 of Figure 3.

The safety two-hand control is mounted in a hood 1 which is by means of fixing screws 2 attached at a suitable place on the eccentric press. By means of push buttons 3 and 4 it is possible to actuate levers 5 and 6, and 7 and 8 respectively, articulately connected to said push buttons, said levers being also articulately connected with the respective two slide valves 9 and 10.

Figure 9:
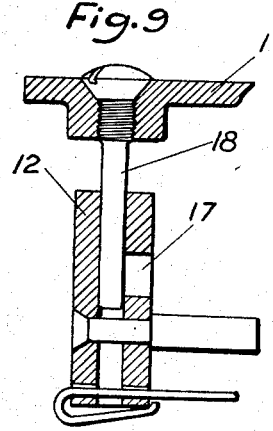
Figure 9 is a vertical section of one of two shift members, taken on line 9—9 of Figure 4, said two shift members enabling by manual adjustment a two-hand start or a one-hand start.
Figure 7:
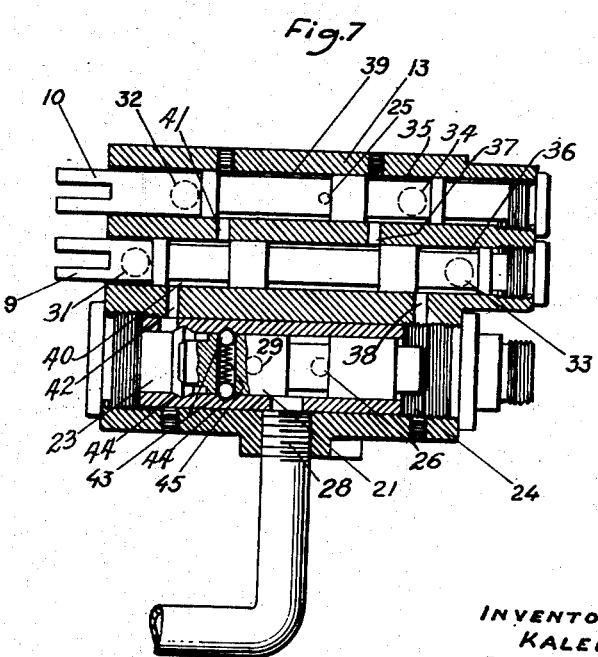
Fig. 7 is a view similar to Fig. 6 but showing the valves in end positions.

Levers 5 and 7 move into recesses such as 17 (see Figure 9) while levers 6 and 8 will contact the outer surface of the rotatable cam members 11 and 12. Consequently the levers 5 and 7 will move idly about their pivot points at the left ends of slide valves 9 and 10 as seen in Figure 4, but levers 6 and 8 fulcrum against the outer surface of the members 11 and 12 and the two valves 9 and 10 can be pressed inwards in a common valve box 13 under compression, i. e. against the action of springs 14 and 15 actuating the valves. When pushed into their end positions the valves are positioned as shown in Figure 7. In the position of the rotatable cams shown in Figure 4 they do not offer any contact surface to the levers 6 and 7 due to edge recesses 16 and 17. Thus, a depression of the button 3 will result in an actuation of the valve 9 only, and in the same manner only the valve 10 will be displaced by means of the button 4. If the two cams 11 and 12 are turned around their pivots 18 by displacing a coupling bar 19 to the left according to Figure 1 to the position marked in dot and dash lines, also the levers 6 and 7 will contact the cams, and therefore a depression of any of the two buttons 3 and 4 results in both valves being pushed in. The coupling bar 19 is locked in its two end positions by a lock 20.

It is clear from the description given below that the press cannot be started until both valves 9 and 10 have been actuated and that a repeated start is not obtained until both these valves have had an opportunity of returning to the initial position shown in Figure 5 and then have been actuated again. Consequently the apparatus functions as two-hand start with the coupling bar in its shown right position and as one-hand start in the shown left position. A cylindrical screw elongation 27 forms an abutment limiting the movement of the valves 9 and 10.

Figure 8:
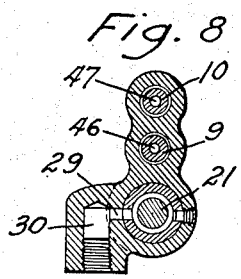
Figure 8 is a cross section of the said valve box taken on line 8—8 of Figure 4.

In the valve box 13 in which the two valves 9 and 10 work, there is also an auxiliary plunger 21 the position of which is determined by the air pressure against the end surfaces of the plunger, thus by the pressures in two chambers 23 and 24. The valve box has also a bore 22 which communicates with an air pressure conduit. Channels 25 and 26 extend from the bore 22 to the manually operatable plunger 10, and to the auxiliary plunger 21 respectively. Another bore 28 is connected with an air pipe communicating with the cylinder for the abovementioned starting plunger for the press. Furthermore, there is a channel 29 which by means of a threaded outlet 30 according to Figure 8 is adapted to be connected with a pipe opening to the atmosphere. The compressed air from the starting plunger cylinder is discharged through said outlet, and as said quantity is rather great, exhaustion of said air close to the operator of the press would be annoying. The compressed air—the volume of which is very small—used for the displacement of the auxiliary plunger 21 is discharged directly to the atmosphere through some of the bores 31, 32, 33 or 34, Figures 6 and 7.

In the position of the pistons or valves 9 and 10 shown in Figure 5, which position is obtained when the two push buttons 3 and 4 have been released as stated above, the compressed air channel 25 communicates, via two annular chambers 35 and 36 and apertures 37 and 38, with the chamber 24. As in this position of the valves 9 and 10 the chamber 23 communicates with the atmosphere through an aperture 42 and an annular space 40 and the aperture 31, the auxiliary plunger 21 has by the air pressure in the chamber 24 been pressed over to the left in Figure 5. In this position of the plunger the bore or connection 28 from the starting plunger cylinder communicates with the atmosphere through the outlet duct 29.

No start is obtained in this position, but the starting plunger cylinder is ready to start as soon as a sufficiently high air pressure is admitted through the connection 28. This takes place if the air pressure is sufficiently high and if the auxiliary plunger 21 is caused to assume the position shown in Figure 7, the communication between the connection 28 and the channel 29 having been interrupted but a communication between the compressed air channel 26 and the connection 28 having been made.

In order that the starting apparatus shall have no tendency to start the press if the air pressure is not sufficiently high, the device is locked by means of two balls 43 actuated by a compression spring 45, said balls being, in the end positions of the auxiliary plunger, pressed into grooves 44 in the inner wall surface of the auxiliary plunger. The spring 45 is so adjusted that such a high air pressure is required for the displacement of the auxiliary plunger that there will never be the question of a readjustment of the same without the air pressure being so high that an immediate start takes place when the air passes to the starting cylinder.

In order to move the auxiliary plunger to the position shown in Figure 7, it is required that the chamber 23 be set in communication with the compressed air channel 25 and that simultaneously the chamber 24 communicates with the atmosphere so that the overpressure in the chamber ceases. The condition when one only of the two valves 9 or 10 is moved to the right may be best seen in Figure 5, i. e. at any displacement of a valve the result will be that the chamber 24 is evacuated without any compressed air being admitted to the chamber 23. If only the valve 9 is moved to the right, the chamber 24 is set in communication with the atmosphere through the aperture 38, the chamber 36 and the bore 33 while the chamber 23 is still free from pressure due to the communication with the atmosphere through the aperture 42, the chamber 40, an aperture 41 and the bore 32. The same will be the case if only the valve 10 is displaced. In this case the chamber 23 communicates with the atmosphere through the aperture 42, the chamber 40 and the bore 31, and the chamber 24 communicates with the atmosphere through the aperture 38, the chamber 36, the aperture 37 and the bore 34. If, on the other hand, both valves are moved to their right end position as shown in Figure 7, the chamber 23 communicates with the compressed air channel 25 while the chamber 24 is free from pressure. The auxiliary plunger is then shifted to its right position, and compressed air from the channel 26 is directed through the connection 28 to the starting plunger of the press. The press now immediately performs one stroke. It is evident from the above statements that a new stroke cannot be obtained until the pressure is discharged from the starting cylinder. It is also evident from the above statements that this can only be attained by returning the valve 9 as well as the valve 10 to the position shown in Figure 5. Consequently, the two push buttons must first be released and then they have to be depressed again, to obtain a new start of the press.

Figure 6:
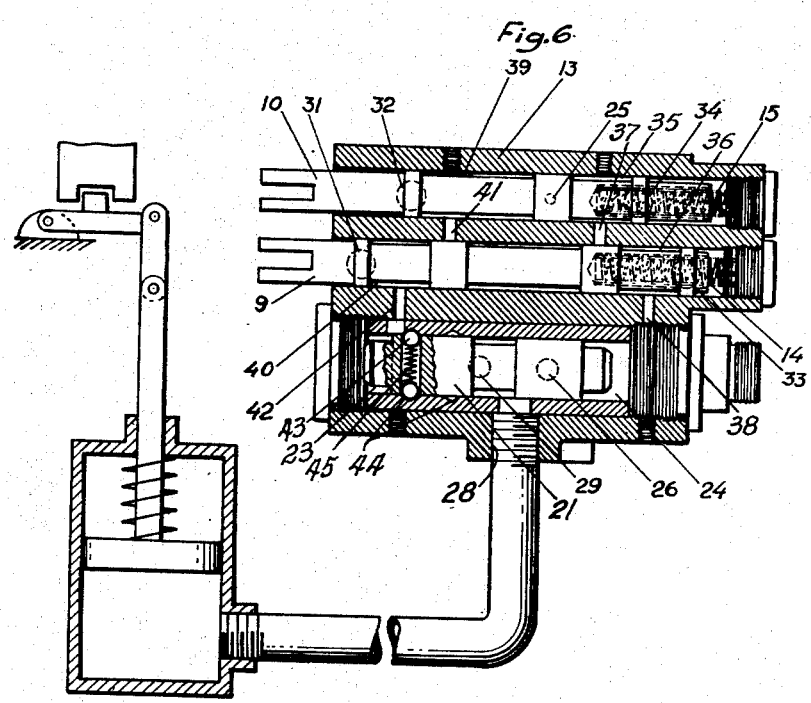
Figure 6 is a longitudinal section of an inner part of the device, viz. a valve box, in which two slide valves and an auxiliary plunger are movably arranged, said valves being shown in intermediate positions.

In Figure 6, which shows both valves 9 and 10 in an intermediate position, it is illustrated that at leakage past one of the valves there is even no possibility of obtaining pressure in the chamber 23 or in the chamber 24 if either of the valves is in an intermediate position. If the valve 9 is in an intermediate position, the chamber 23 as well as the chamber 24 are in direct communication with the atmosphere through the connection 42, 40, 31, and the connection 38, 36, 33 respectively, while the two apertures 37 and 41 through which compressed air can be directed by the valve 10, are shut. That compressed air cannot be directed to any place when the valve 10 is in an intermediate position, is evident from the fact that in this case two annular chambers, viz. the chamber 35 and a chamber 39 at the intermediate portion of the valve both communicate with the atmosphere through the bore 34, and 32 respectively. Two bores 46 and 47, Figure 8, are made in the respective valves 9 and 10 to ensure atmospheric pressure at the inner end surfaces of the valves.

As will be seen from Figures 1 and 4, the heads of the push buttons 3 and 4 are preferably surrounded by an annular collar or the like which prevents an operator from raising a knee, for example, for depressing the buttons. The buttons should be depressed by means of the two thumbs of the operator.

The details described above may, of course, also be carried out and placed in some other manner without departing from the idea of the invention.

Having now described my invention, what I claim as new and desire to secure by Letters Patent is:

1. In a pressure actuated starting device for machine tools, in combination, a starting piston, a pair of control buttons separated by a distance such that operation thereof by one hand is impossible, two slide valves, a piston valve controlling ports to admit pressure fluid to said machine tool starting piston and to release pressure therefrom, means controlled by said slide valves to admit pressure fluid to one side of said piston valve and to release pressure from the other side thereof when both slide valves are actuated, passage means controlled jointly by said slide valves to release pressure fluid from said one side of said piston valve and to admit pressure fluid to the other side of said piston valve when both said slide valves are in released position, passage means controlled jointly by said slide valves for releasing pressure from both sides of said piston valve when one of said slide valves is actuated and the other released, means connecting each of said control buttons with both of said slide valves, said connecting means comprising a pair of levers pivotally connected to each button, each lever of said pair being pivotally connected to one of said slide valves, and cam means cooperating with said levers, said cam means serving as fulcrums for said levers and being adjustable rendering all four levers operable in one position and one lever of each pair of levers operable in the other position.

2. A device as claimed in claim 1, characterized in that an adjusting bar is provided, said bar serving to rotate said cam means simultaneously, said adjusting bar extending to the exterior of the device and being provided with means for locking it in either of its two adjusted positions.

References Cited in the file of this patent

UNITED STATES PATENTS

| Number | Name | Date |
| --- | --- | --- |
| 2,253,544 | Williams | Aug. 26, 1941 |
| 2,305,089 | Koepcke | Dec. 15, 1942 |
| 2,453,812 | Phelan | Nov. 16, 1948 |
| 2,567,444 | Neckel | Sept. 11, 1951 |
| 2,598,907 | Griffin | June 3, 1952 |